United States Patent [19]

Wefers et al.

[11] Patent Number: 4,784,707

[45] Date of Patent: Nov. 15, 1988

[54] METHOD OF MAKING ELECTRICAL CONNECTIONS USING JOINT COMPOUND

[75] Inventors: Karl Wefers, Upper Burrell Township, Pa.; Larry T. Taylor; Richard H. Bott, both of Blacksburg, Va.

[73] Assignee: Aluminum Company of America, Pittsburgh, Pa.

[21] Appl. No.: 827,990

[22] Filed: Feb. 7, 1986

[51] Int. Cl.[4] .............................................. B32B 13/06

[52] U.S. Cl. ........................................ 156/48; 156/49; 156/52; 156/330.9; 174/88 B; 174/88 R; 439/874

[58] Field of Search .................. 156/48, 49, 52, 330.9; 174/16 B, 88 B, 88 R; 339/60 R, 117 R, 118 R, 275 C

[56] References Cited

U.S. PATENT DOCUMENTS

| | | | |
|---|---|---|---|
| 3,856,752 | 12/1974 | Bateman et al. | 528/188 X |
| 4,543,295 | 9/1985 | St. Clair et al. | 428/458 |
| 4,588,456 | 5/1986 | Dery et al. | 174/88 R X |

*Primary Examiner*—Robert A. Dawson

*Attorney, Agent, or Firm*—Daniel A. Sullivan, Jr.

[57] ABSTRACT

Electrical joint compounds for the protection of electrical connections are formed from a solution of polymer dissolved in solvent with or without conductive filler. Partially cured thermosetting polymers are preferred as they flow under service conditions to better seal the electrical joints. Thermosetting polymers which cure by an addition mechanism are preferred over those which cure by condensation, and polyimides are most preferred.

22 Claims, 1 Drawing Sheet

METHOD OF MAKING ELECTRICAL CONNECTIONS USING JOINT COMPOUND

TECHNICAL FIELD

This invention relates to protective compositions for mechanically joined electrical connections.

BACKGROUND ART

U.S. Pat. No. 3,157,735 discloses an electrical joint compound made of grease mixed with intermetallic compound particles. A problem with such compounds is that heat, for instance heat generated by resistance heating at conductor contacts, can drive off the grease. This opens the joint to oxidation by water, oxygen, etc, which increases the joint resistance. A vicious circle can ensue, leading to joint failure.

U.S. Pat. No. 3,205,299 mentions in its introduction attempts to join conductors using solder composed of powdered metal suspended in epoxy resin, but states that such attempts have been unsuccessful. Its proposed solution is to provide adhesive and metal powder on metal foil and place the resulting tape between the connectors.

DISCLOSURE OF INVENTION

It is an object of this invention to provide polymer-based methods and compositions which mitigate the above-stated problems of the background art.

A further object of the invention is specifically the protection of the electrical bus bar connections in Hall-Heroult aluminum-producing cells against degradation over time due to surface oxidation.

Another object of the invention is the provision of an improved joint compound for use in the joining of electrical cables.

These as well as other objects which will become apparent in the discussion that follows are achieved, according to the present invention, by using a solution of polymer dissolved in solvent as a joint compound.

An introduction to the subject of joint compounds is contained in the report of the Canadian Electrical Association, Montreal, Quebec, referenced Subject No. 158 D 319, entitled "An Investigation into Contact Aids (Compounds) for Aluminum to Aluminum and Aluminum to Alloy Connections".

Percentages herein are on a weight basis, unless stated otherwise.

BEST MODE FOR CARRYING OUT THE INVENTION

Figure 1:
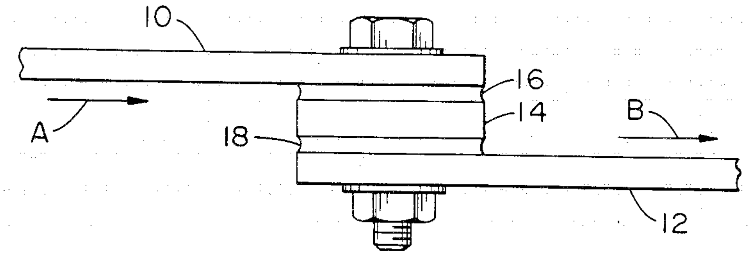
FIGS. 1 and 2 are side elevational views of bus connections according to the invention.

The invention was tested using an electrical connection as shown in FIG. 1. This connection was chosen as representative of bus connections used for Hall-Heroult cells. The bus units 10 and 12 were 6″×2″×¼″ aluminum bars. The intermediate spacer 14 of the same material measured 2″×2″×¼″. During test, electrical current flows through bus 10 in the direction of arrow A, across the connection, and out through bus 12 in the direction of arrow B. A coating of electrical joint compound according to the invention is shown at 16 and 18 between the spacer and the bus units for sealing the surfaces at the electrical current transferring interfaces against attack by oxygen.

The electrical connection is held together by a bolt, nut, and washer in the form of Belleville springs, as shown. Alternatively, the bolt can be omitted and the adhesive nature of the polymer-based joint compound relied upon to keep the spacer in place.

Figure 2:
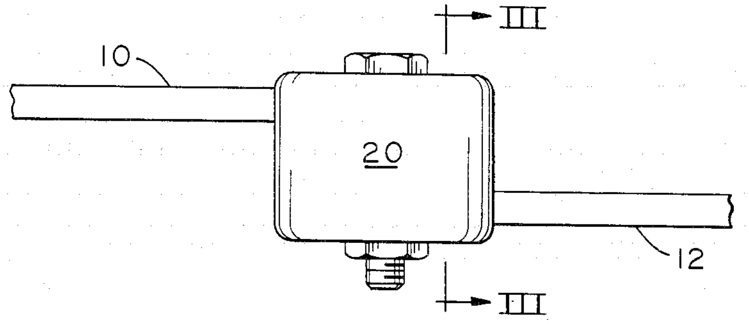
Figure 3:
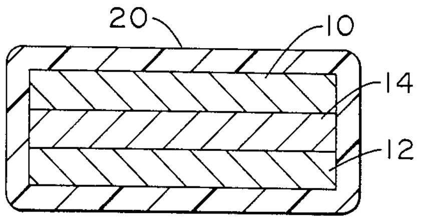
FIG. 3 is a cross sectional view taken according to the cutting plane III in FIG. 2.

While the joint compound is illustrated in FIG. 1 as placed between the bus units and the spacer, alternatively the bus units and spacer can contact one another and the joint compound supplied as a continuous coating around the sides of the connection to seal against encroachment of oxygen into the current transferring interface. This is illustrated in FIGS. 2 and 3, where joint compound in the form of coating 20 is placed all around the sides of the connection to seal the electrical current transferring interfaces against the encroachment of oxygen which could otherwise oxidize the metal surfaces at the interfaces and increase resistance to the flow of electrical current.

Figure 5:
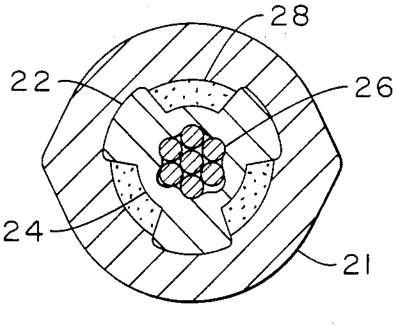
FIG. 5 is a cross sectional view of a cable connection according to the invention.

FIG. 5 corresponds to FIG. 6 in U.S. Pat. No. 3,996,417 and shows another environment for use of the invention. An electrical cable connection is illustrated after crimping of compression barrel 21. Lobes 22 of core grip sleeve 24 are compressed radially inwardly into tight engagement against the outer surfaces of a conductor core 26. Joint compound 28 substantially fills the spaces between the lobes 22 of the core grip 29.

Polymers suitable for use in the joint compound of the present invention include both thermoplastic and thermosetting polymers. In the case of embodiments as in FIG. 1, thermosetting polmers which cure by an addition mechanism are preferred over those which cure by condensation. Thus, it has been found that water evolution within the interface region can lead to gas pockets which are deleterious to electrical conductivity across the interface. In the case of embodiments as in FIGS. 2 and 3, this disadvantage of condensation polymers should be less significant, since evolved water does not have to travel far for release into the atmosphere.

High temperature durability and an ability to bond to the metal being covered are additional considerations in choosing suitable polymers. Polyimides are a polymer class of preference. They have good high temperature durability and bond securely to aluminum, so as to prevent oxygen from diffusing at the metal-polymer interface.

In the embodiment according to FIG. 1, it is of advantage that the joint compound be conductive, and this is accomplished by compounding the polymer with conductive fillers. A suitable filler for this purpose is aluminum-nickel powder, or grit, containing 50% Al, 50% Ni.

The polymer is dissolved in a solvent to form the joint compound of the invention. Thus, experiments were performed where an attempt was made to apply the polymer in powder form; results were not as favorable as for application with a solvent. Viscosity of the solution forming the joint compound is also important; when viscosity was too high, air pockets apparently were entrapped in the embodiment of FIG. 1, leading to decreased conductivity. Besides solvent concentration, viscosity can also be affected by the molecular weight of the polymer.

Examples of suitable solvents are the organic solvents tetrahydrofuran (THF) and N,N-dimethylacetamide (DMAC). The volatility of the solvent used to form the joint compound can also play a part. For example, the higher boiling solvent DMAC continues to evaporate at higher temperatures, this leading to creation of voids, loss of contact with the metal and increased resistance. In contrast, the low boiling THF is removed more thoroughly at lower temperatures, but even it can give solvent entrapment problems when coupled with higher molecular weight polymer.

Depending on particular circumstances, suitable alternatives for THF may be dioxane, toluene, or chloroform; for DMAC alternatives may be DMSO, NMP (N-methyl pyrolidone), or DMF (dimethyl formamide).

Testing has also shown it to be of advantage not to have thermosetting polymers completely cross linked when they are placed into service. To the extent that the electrical connection warms, curing proceeds further; it is believed that this is of advantage in preventing the vicious circle behavior mentioned in the Background Art above.

The following are examples illustrating and comparing the present invention:

EXAMPLE I

Figure 4:
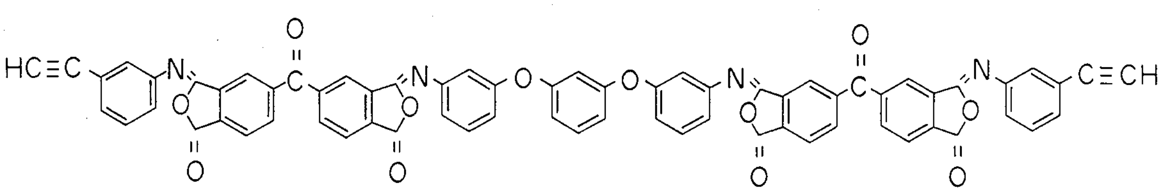
FIG. 4 is a structural formula of a polymer suitable for use in the invention.

Joints were prepared by applying joint compound in the form of a slurry of polymer solution and aluminum-nickel grit (solvent THF, i.e. tetrahydrofuran) to the bus units as in FIG. 1. A 40% solids, 60% liquid formulation was used. 50% of the solids was Thermid IP-600 and 50% was aluminum-nickel alloy grit. Thermid IP-600 is an example of an addition-type thermosetting polymer and is an acetylene-terminated polyisoimide precursor available from National Starch and Chemical Corp. of Plainfield, N.J. Its structural formula is illustrated in FIG. 4. Its molecular weight is 1099. It comes in the form of a yellow powder of 1.34 specific gravity.

The aluminum-nickel grit particle size was about 53 microns. The resulting slurry with Thermid IP-600 and THF has a consistency about like that of house paint, and application to the bus units was by brush. The joints were assembled by interposing the spacer, and then bolting. The assemblies subsequently stood at room temperature for 24 hrs to allow the solvent to evaporate before testing. No other advance curing was performed.

Resistance measurement results are given in Table I. The following general measurement procedure was employed. The room temperature resistance with bolt was first measued. The bolt was then removed and the room temperature resistance without bolt measured. The joint was next wrapped with heating tapes and the elevated temperature resistance without bolt obtained. Finally, the bolt was replaced, the heating tapes once again attached and the elevated temperature resistance with bolt measured.

EXAMPLE II

Procedure was as in Example I, except that XU218 polyimide polymer was used as an example of a thermoplastic. This is a soluble, fully imidized polyimide resin available from Ciba-Geigy Corp. It is derived from phenylindane diamine and dianhydride, as described more fully in U.S. Pat. No. 3,856,752. Results are shown in Table I.

TABLE I

RESISTANCE OF Al—Al JOINTS COMPARISON OF POLYIMIDE MATRIX[a]

| Polyimide | Room Temperature($\mu\Omega$) With Bolt | Room Temperature($\mu\Omega$) No Bolt | 100° C.($\mu\Omega$) With Bolt | 100° C.($\mu\Omega$) No Bolt |
|---|---|---|---|---|
| Thermid IP-600 | 13.3 ± 1.0 | 14.5 ± 1.5 | 12.4 ± 1.5 (24 hrs.) | 19.5 ± 2.5 (613 hrs.) |
| XU218 | 13.4 ± 4.0 | 16.0 ± 4.0 | — | 18.7 ± 3.5 (24 hrs.) |

[a]Data represent the average of 3 individually measured joints.

EXAMPLE III

A joint as in FIG. 1 was assembled wherein a prior art grease formulation was used in place of the coatings of polymer at 16 and 18. Initially, resistance measured about 7 microohms, but, after 110 hours at room temperature, resistance had risen to over 140 microohms.

In the case of the cable connection of FIG. 5, provision of the hard aluminum-nickel grit in joint compounds has had the advantage of providing an extra locking of the connection together as a result of penetration of the grit particles into the metal members during crimping. Since polyimides are good, thermally stable adhesives, use of the preferred joint compound of the invention provides additional mechanical strength in cable connections, besides functioning to exclude aggressive environmental constituents such as oxygen and moisture. Added mechanical strength is an important advantage, especially for cable connections in electrical transmission lines suspended between towers, where significant shear loadings of crimped mechanical connections exist.

We claim:

1. In a method of making an electrical connection wherein joint compound is applied, the improvement comprising applying as joint compound a solution of polymer and electrically conductive filler dissolved in solvent.

2. A method as claimed in claim 1, the electrical connection comprising aluminum metal.

3. A method as claimed in claim 2, said polymer comprising polyimide.

4. A method as claimed in claim 1, wherein the joint compound is applied at an interface and the polymer is an addition-type thermosetting polymer or a thermoplastic polymer.

5. A method as claimed in claim 4, the joint compound containing an electrically conductive filler.

6. A method as claimed in claim 1, the solvent and polymer being matched in relative amounts and character essentially to avoid air pockets, voids, and loss of contact.

7. A method as claimed in claim 1, said polymer comprising polyimide.

8. A method as claimed in claim 7, said polymer comprising a polyisoimide having a structural formula essentially as follows

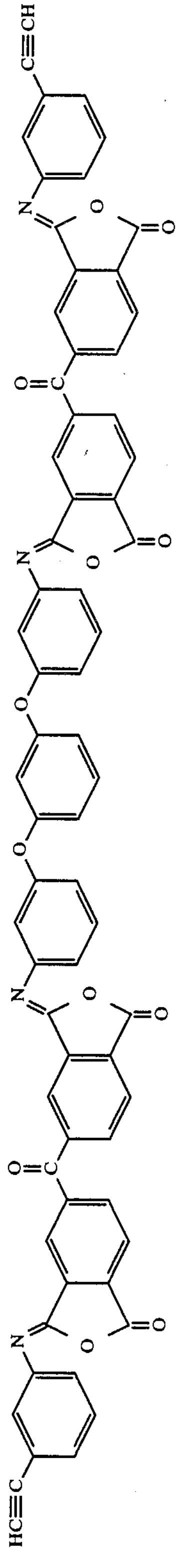

9. A method as claimed in claim 8, the solvent comprising THF.

10. A method as claimed in claim 7, said polymer comprising an essentially fully imidized polyimide resin derived from phenylindane diamine and dianhydride.

11. A method as claimed in claim 10, said solvent comprising THF.

12. In a method of making an electrical connection wherein joint compound is applied, the improvement comprising applying as joint compound a solution of incompletely cross linked flowable thermosetting polymer dissolved in solvent, and not fully cross linking the polymer until the electrical connection is placed in use.

13. A method as claimed in claim 12, the electrical connection comprising aluminum metal.

14. A method as claimed in claim 13, said polymer comprising polyimide.

15. A method as claimed in claim 12, wherein the joint compound is applied at an interface and the polymer is an addition-type thermosetting polymer.

16. A method as claimed in claim 15, the joint compound containing an electrically conductive filler.

17. A method as claimed in claim 12, the solvent and polymer being matched in relative amounts and character essentially to void air pockets, voids, and loss of contact.

18. A method as claimed in claim 12, said polymer comprising polyimide.

19. A method as claimed in claim 18, said polymer comprising a polyisoimide having a structural formula essentially as set forth in claim 18.

20. A method as claimed in claim 19, the solvent comprising THF.

21. A method as claimed in claim 18, said polymer comprising an essentially fully imidized polyimide resin derived from phenylindane diamine and dianhydride.

22. A method as claimed in claim 21, said solvent comprising THF.

* * * * *

UNITED STATES PATENT AND TRADEMARK OFFICE
CERTIFICATE OF CORRECTION

PATENT NO. : 4,784,707

DATED : November 15, 1988

INVENTOR(S) : Karl Wefers, Larry T. Taylor, Richard H. Bott

It is certified that error appears in the above-identified patent and that said Letters Patent is hereby corrected as shown below:

Column 4, lines 53-54 (Claim 5) Claim 5 should be deleted.

On the title page "22 Claims" should read -- 21 Claims --.

Signed and Sealed this

Twenty-eighth Day of March, 1989

*Attest:*

DONALD J. QUIGG

*Attesting Officer* *Commissioner of Patents and Trademarks*